United States Patent [19]

Ito

[11] Patent Number: 5,168,516

[45] Date of Patent: Dec. 1, 1992

[54] RADIO TELEPHONE HAVING IMPROVED MODULATION CHARACTERISTICS FOR DATA TRANSMISSION

[75] Inventor: Koichi Ito, Tokyo, Japan

[73] Assignee: Kabushiki Kaisha Toshiba, Kawasaki, Japan

[21] Appl. No.: 497,847

[22] Filed: Mar. 23, 1990

[30] Foreign Application Priority Data

Mar. 24, 1989 [JP] Japan .................. 1-73485

[51] Int. Cl.[5] ........................................ H04M 11/00
[52] U.S. Cl. ...................................... 379/58; 379/61; 455/70; 455/93
[58] Field of Search ............... 379/58, 59, 61, 63, 379/100, 98; 455/70, 54, 103, 93, 33, 102

[56] References Cited

U.S. PATENT DOCUMENTS

| | | | |
|---|---|---|---|
| 4,654,867 | 3/1987 | Labedz et al. | 379/59 |
| 4,661,659 | 4/1987 | Nishimura | 379/63 |
| 4,780,715 | 10/1988 | Kasugai | 455/54 |
| 4,837,800 | 6/1989 | Freeburg et al. | 379/59 |
| 4,881,129 | 11/1989 | Mitsuhashi | 379/100 |

FOREIGN PATENT DOCUMENTS 0042440 4/1981 Japan .................. 379/59

OTHER PUBLICATIONS

Advertisement: Hello Direct Catalog, "Now You Can Transmit and Receive Data from Your Cellular Phone-Error Free"; p. 22, May 1988.
Advertisement: Telephony, "Cellular Option/The Cellular Connection"; p. 62, Dec. 1986.
Article: The Washington Post, "Fax in the Fast Lane"; Style Section, Dec. 29, 1988, by Megan Rosenfeld.

Primary Examiner—Curtis Kuntz
Assistant Examiner—Dwayne D. Bost
Attorney, Agent, or Firm—Finnegan, Henderson, Farabow, Garrett and Dunner

[57] ABSTRACT

A radio telephone system of the multi-channel access type using an empty channel selected from a plurality of channels for radio telephone communication of voice audio or data signals and a method of controlling such a radio telephone system. The method and apparatus can improve the data communication quality without reducing the number of available channels. A switching circuit is provided in at least one of the base unit and the radio telephone for changing the frequency characteristic of the signal to be transmitted when the signal is a data signal.

13 Claims, 9 Drawing Sheets

RADIO TELEPHONE HAVING IMPROVED MODULATION CHARACTERISTICS FOR DATA TRANSMISSION

BACKGROUND OF THE INVENTION

1. Field of the Invention

This invention relates to a radio telephone system of the multi-channel access type using an empty channel selected from a plurality of channels for radio telephone communication of a voice audio or data signal and a control method therefor.

2. Description of the Related Art

A radio telephone system from which this invention is improved will be described in order to specifically point out the difficulties attendant thereon.

Referring to FIG. 1, the radio telephone system includes a base unit 1 connected to the conventional telephone network 3, and a telephone 2 for radio telephone communication with the base unit 1 through a radio-electric line by a radio circuit.

The base unit 1 includes a transmitter 5 which has inputs from a hybrid circuit 4 and a frequency synthesizer 9. The hybrid circuit 4 is connected through a line switch 33 to the telephone network 3. A control circuit 12 is connected to the frequency synthesizer 9 for selecting transmitter and receiver frequencies for a specified control or speech channel. In the transmitter 5, the signal from the hybrid circuit 4 is converted into a modulating signal which is used to modulate a carrier wave fed from the synthesizer 9. The carrier wave has a frequency selected for the specified control or speech channel. The modulated signal is transmitted through a transmit aerial 6 to the radio telephone 2. The telephone network 3 is also connected directly to a call signal detector 30 which produces a call detection signal to the control circuit 12 in the presence of a call signal from the telephone network 3.

The base unit 1 also includes a receiver 8 connected to a receive aerial 7 for the receipt of a signal transmitted from the radio telephone 2. The receiver 8 is associated with the synthesizer 9 to demodulate the received signal so as to recover the original signal. The demodulated signal is fed to the hybrid circuit 4 and also to the control circuit 12. Further, the demodulated signal is fed from the receiver 8 to a field detector 10 and also to an identification detector 11. The field detector 10, which may be taken in the form of a carrier or noise squelch circuit, makes a check whether or not the current channel is busy. This check is made based on the intensity of the electric field of the demodulated signal. The result is fed from the field detector 10 to the control circuit 12. The identification detector 11 verifies the identification code included in the demodulated signal and feeds the result to the control circuit 12.

The radio telephone 2 includes a speaker 15 and a microphone 16 for voice audio. The speaker 15 is connected to a receiver 14 which is associated with a frequency synthesizer 19 to demodulate the signal received by a receive aerial 13. A control circuit 22 is connected to the frequency synthesizer 19 for selecting transmitter and receiver frequencies for a specified control or speech channel. The demodulated signal is applied from the receiver 14 to excite the speaker 15. The demodulated signal is also fed to a field detector 20 and an identification detector 21. The field detector 20, which may be taken in the form of a carrier or noise squelch circuit, checks whether or not the current channel is busy based on the intensity of the electric field of the demodulated signal fed thereto from the receiver 14. The result is fed from the field detector 20 to the control circuit 22. The identification detector 21 verifies the identification code included in the demodulated signal and feeds the result to the control circuit 22.

The voice audio from the microphone 16 is fed to a transmitter 17 which uses it to modulate a carrier wave fed thereto from the synthesizer 19. The carrier wave has a frequency selected for the specified control or speech channel. The modulated signal is transmitted through a transmit aerial 18 to the base unit 1. The radio telephone 2 also includes a call switch 31 connected to the control circuit 22 for producing a call signal from the radio telephone 1, and a pushbutton dial connected to the control circuit 22 for entering the digits of a telephone number. The control circuit 22 is also connected to excite a speaker 23 which simulates the ringing signal in the radio telephone 2.

The numeral 24 designates a plug for connection to a commercial power line (AC100 volts). The plug 24 is connected to a power unit 25 including a rectifier and a voltage stabilizer for powering the components of the base unit 1. The power unit 25 is also connected through a current limiting resistor 26 to a power terminal 28 used, along with an earth terminal 27, for charging a rechargeable battery 29 with which the components of the radio telephone 2 are powered.

The operations of the control circuits 12 and 22 are as follows: When a call from an outside caller arrives at the base unit 1 through the telephone network 3, the call signal detector 30 conveys this information to the control circuit 12 which thereby produces a control signal causing the synthesizer 9 to produce a carrier wave having a frequency for the control channel to the transmitter 5 and another control signal activating the transmitter 5 to produce a call signal including information specifying a speech channel (S-CH). The call signal is transmitted through the transmit aerial 6 to the handset 2.

In the radio telephone 2, the receiver 14 remains in a "stand-by" condition awaiting the receipt of a signal transmitted from the base unit 1. In this condition, the control circuit 22 controls the synthesizer 19 in such a manner as to produce a receiver frequency specified for the control channel for a predetermined period of time. When the call signal is received by the receive aerial 13, the control circuit 22 activates the transmitter 17 to transmit a call response signal including an identification code assigned to the radio telephone 2 through the transmit aerial 18 and controls the synthesizer 19 to change the transmitter and receiver frequencies to a value for the speech channel specified by the information included in the received call signal.

When the call response signal is received by the receive aerial 7, the receiver 8 demodulates the received call response signal. The demodulated signal is fed to the field detector 10. The field detector 10 produces a signal indicative of the receipt of the call response signal from the radio telephone 2 to the control circuit 12 which thereby produces a control signal causing the transmitter 5 to stop the transmission of the call signal. The demodulated signal is also applied from the receiver 8 to the identification detector 11. The identification detector 11 compares the identification code included in the demodulated call response signal with the identification code stored therein. When these two identification codes are identical, the identification detector 11 produces a coincidence signal to the control circuit 12 which thereby produces a control signal causing the synthesizer 9 to produce a carrier wave having a frequency for the speech channel (S-CH) which has been specified by the call signal and another control signal causing the transmitter 5 to produce a ringing signal. The ringing signal is transmitted through the transmit aerial 6 to the radio telephone 2. If the two identification codes are not identical, it means that the call response signal received by the receive aerial 7 is transmitted from another set of radio telephones and the control circuit 12 places the base unit 1 in a condition awaiting another call through the telephone network 3 after the termination of the existing call signal through the telephone network 3.

When the receive aerial 13 receives the ringing signal transmitted from the base unit 1, the control circuit 22 excites the speaker 23 which simulates the ringing signal in the radio telephone 2. The user who intercepts the ringing signal by adjusting the call switch 31 to the "on" position causes the control circuit 22 to activate the transmitter 17 so as to transmit an off-hook signal through the transmit aerial 18. When the receiver 8 receives the off-hook signal through the receive aerial 7, the control circuit 12 closes the line switch 33 to bring the caller and the person called in contact.

To make a call from the radio telephone 2, the call switch 31 may be changed to the "on" position. This operation causes the control circuit 22 to operate the synthesizer 19 so as to select transmitter and receiver frequencies for the control channel (C-CH) and to place the receiver 14 in a "stand-by" condition awaiting the receipt of a signal through the control channel. The received field detector 20 detects the intensity of the electric field of the signal fed thereto from the receiver 14 and compares it with a predetermined value. If the detected field intensity is greater than the predetermined value, the control channel is busy. Otherwise, the control channel is empty and the control circuit 22 activates the transmitter 17 to produce a call signal including an identification code assigned to the radio telephone 2. The call signal is transmitted through the transmit aerial 18 to the base unit 1.

When the receiver 8, which is in a "stand-by" condition awaiting the receipt of a signal through the control channel receives the call signal transmitted from the radio telephone 2, the identification detector 11 compares the identification code included in the received call signal with an identification code stored therein. If the two identification codes are identical, the identification detector 11 produces a coincidence signal causing the control circuit 12 to activate the transmitter 5 so as to produce a call response signal including information specifying an identification code and a speech channel (S-CH) and to control the synthesizer 9 so as to select transmitter and receiver frequencies for the specified speech channel. The call response signal is transmitted through the transmit aerial 6 to the radio telephone 2.

When the receiver 14 receives the call response signal through the control channel, the identification detector 21 compares the identification code included in the received call response signal with an identification code stored therein. If the two identification codes are identical, the identification detector 21 produces a coincidence signal to the control unit 22 which thereby controls the synthesizer 19 so as to select transmitter and receiver frequencies for the speech channel specified by the received call response signal. As a result, communication is established through the specified speech channel between the base unit 1 and the radio telephone 2. The user may operate the pushbutton dial 32 to enter the digits of a telephone number so as to call a person through the telephone network 3. When the receiver 14 has not received any call response signal from the base unit 1 in a predetermined period of time after the call signal is transmitted to the base unit 1, the control circuit 22 excites the speaker 23 which provides an audible reminder to the user that the radio telephone 2 is located far away from the base unit 1 and it places the radio telephone 2 into a "stand-by" condition.

Referring to FIG. 2, the transmitter 17 includes an amplifier 35 connected to an input terminal 34 which is connected to the microphone 16. The amplifier 35 amplifies the voice audio signal fed thereto from the microphone 16 at a predetermined amplification degree. The amplified signal is applied through a pre-emphasis circuit 36 to a limiter 37 and hence through a splatter filter 38 to a radio frequency section 39. The limiter 37 prevents the amplitude of the received signal from exceeding a certain value. The splatter filter 38 produces a modulating signal to the radio frequency section 39 where the modulating signal is used to modulate the carrier wave fed thereto from the frequency synthesizer 19 (FIG. 1). The modulated signal is transmitted through the transmit aerial 18. The modulated carrier wave received through the receive aerial 7 by the receiver 8. The receiver 8 includes a radio frequency section 40 which is associated with the frequency synthesizer 9 (FIG. 1) to demodulate the received signal. The demodulated signal is fed through a de-emphasis circuit 41 to a low-pass filter 42 and hence through an amplifier 43 to an output terminal 44 for connection to the outputs of the receiver 8.

FIG. 3 shows the frequency characteristic of the signal appearing at the output terminal 44. The linear scale is along the vertical axis, and the log scale is along the horizontal axis. As can be seen from FIG. 3, the signal level is dropped below a frequency of 300 Hz and above a frequency of 3000 Hz which is determined to avoid interference between adjacent communication channels. This frequency characteristic is determined by the cutoff frequencies of the circuits 36, 38, 41 and 42.

Although the radio telephone system is arranged to provide a stable frequency characteristic for voice audio signals having a frequency ranging from 300 Hz to 3000 Hz, it cannot satisfy an increasing demand for data signal communication taking the advantage of the cordless telephone system since the available frequency band width (300 Hz to 3000 Hz) is too narrow, as compared to the frequency band width (300 Hz to 3300 Hz) available on the telephone network 3, to ensure the quality with which the data communication is made between the base unit 1 and the radio telephone 2.

It may be considered to solve this problem simply by expanding the frequency band width. However, this solution will result in an expanded frequency band width of each of the speech channels and a reduced number of available speech channels.

SUMMARY OF THE INVENTION

It is, therefore, a main object of the invention to provide an improved radio telephone system and a control method therefor which can improve the quality of the radio telephone communication for data signals such as signals from facsimile systems without reducing the number of available channels.

There is provided, in accordance with the invention, a radio telephone system comprising a base unit connected to a telephone network, a radio telephone for communication with the base unit through a radio-electric link by a radio circuit, first modulation characteristic determining means for determining a modulation characteristic for a first signal transmitted through the radio-electric link between the base unit and the radio telephone, second modulation characteristic determining means for determining another modulation characteristic for a second signal transmitted through the radio-electric link between the base unit and the radio telephone, in which depending on whether the first or second signal is to be transmitted through the radio-electric link, one of the first and second modulation characteristic determining means is selectively used.

In another aspect of the invention, there is provided a method of controlling a radio telephone system including a base unit connected to a telephone network and a radio telephone for communication with the base unit through a radio-electric link by a radio circuit. The base unit includes a transmitter having a changeable frequency characteristic. The radio telephone includes a transmitter having a changeable frequency characteristic. The method comprises the steps of detecting whether a voice audio signal or a data signal is to be transmitted, and changing the frequency characteristics of the transmitters in response to whether the signal to be transmitted is a voice audio signal or a data signal.

BRIEF DESCRIPTION OF THE DRAWINGS

This invention will be described in greater detail by reference to the following description taken in connection with the accompanying drawings, wherein like numerals refer to like parts in several views and in which.

DETAILED DESCRIPTION OF THE INVENTION

Figure 1:
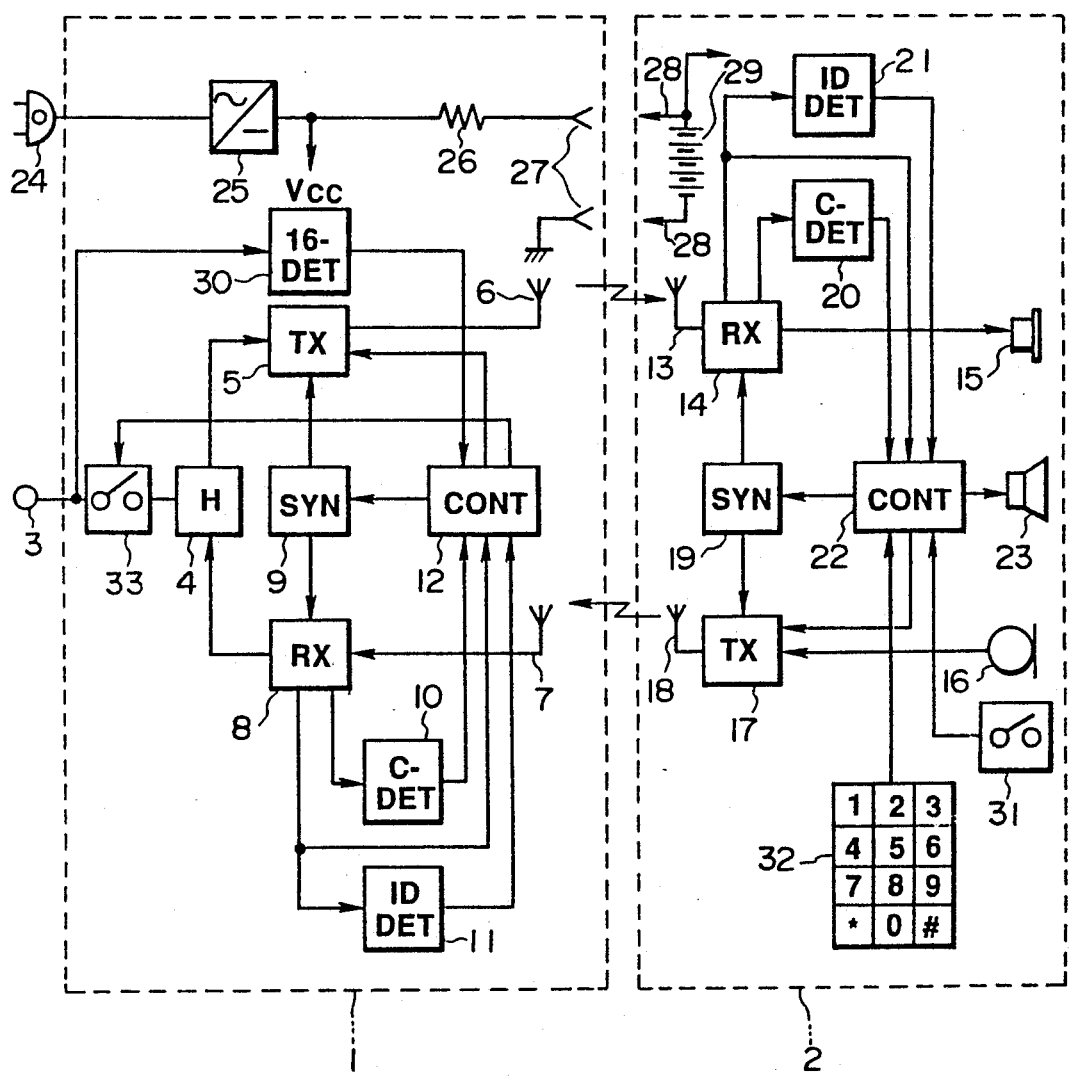
FIG. 1 is a schematic block diagram showing a radio telephone system from which the invention is improved.
Figure 2:
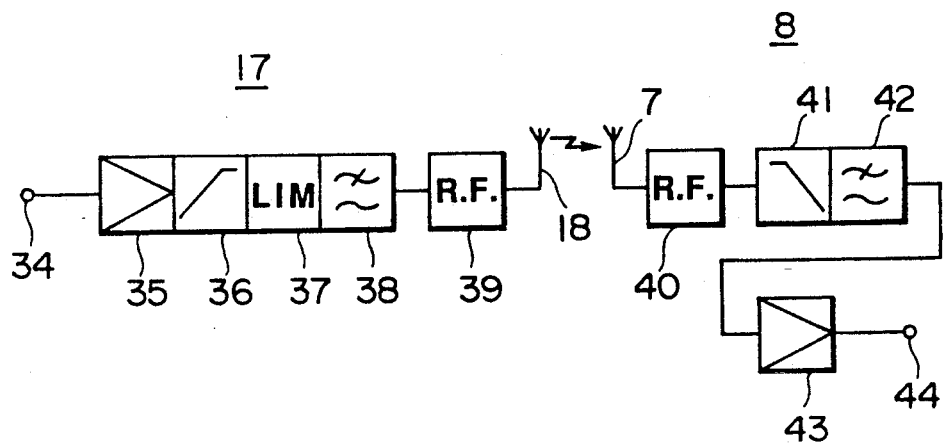
FIG. 2 is a schematic block diagram showing a transmitter and receiver set included in the radio telephone system of FIG. 1.
Figure 3:
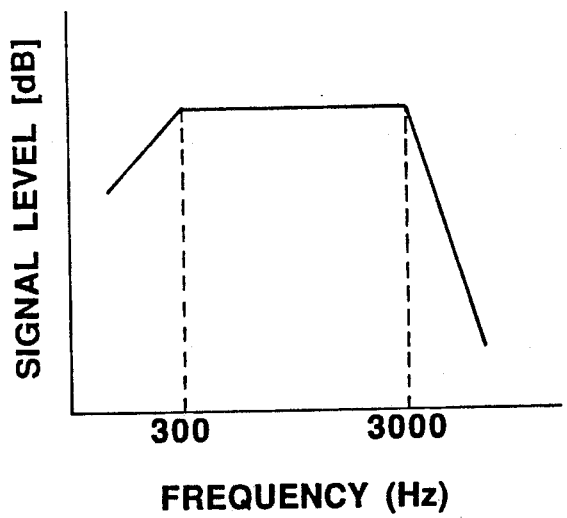
FIG. 3 is a graph of frequency versus level.
Figure 4:
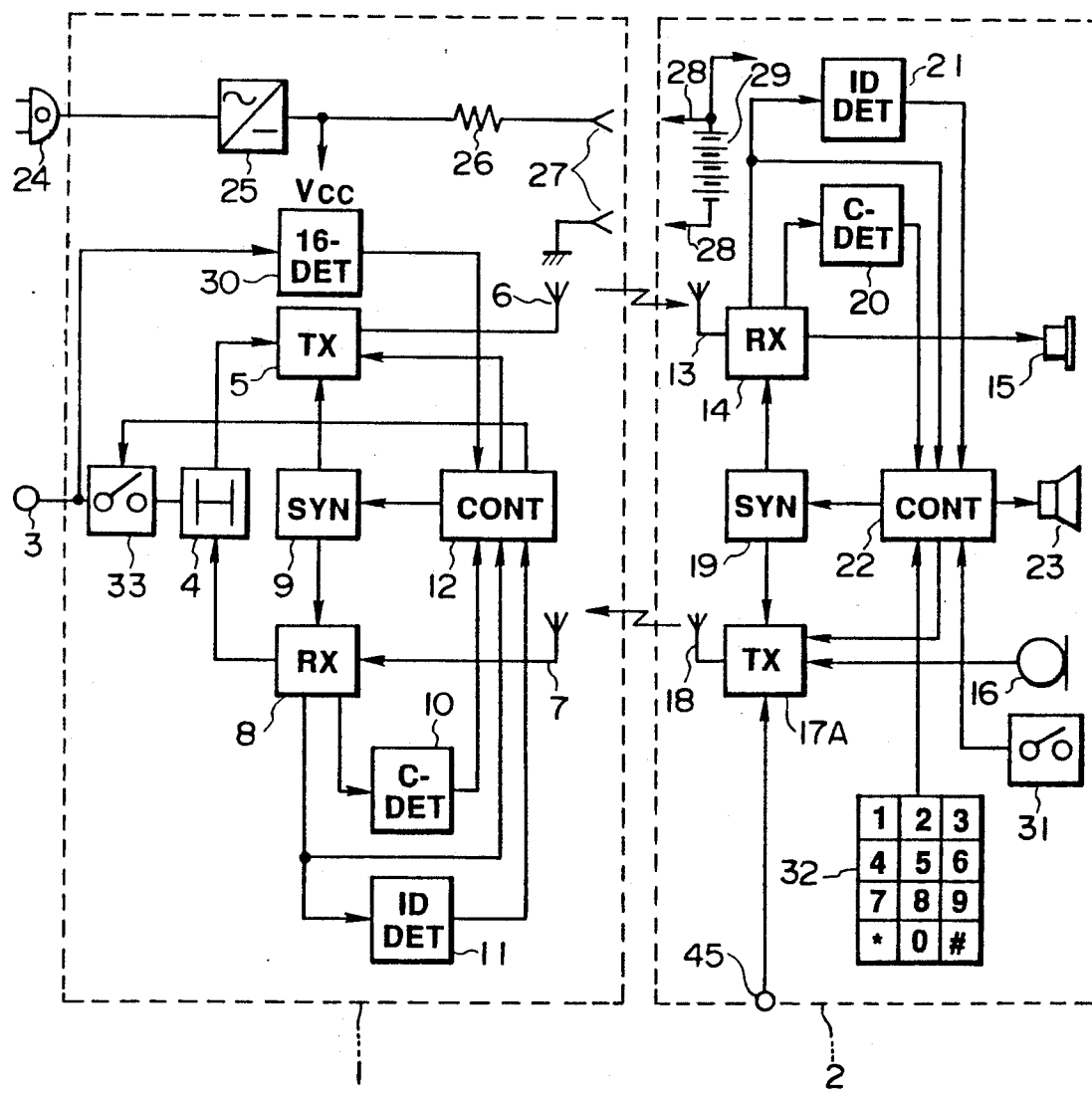
FIG. 4 is a schematic block diagram showing one embodiment of a radio telephone system made in accordance with the invention.
Figure 5:
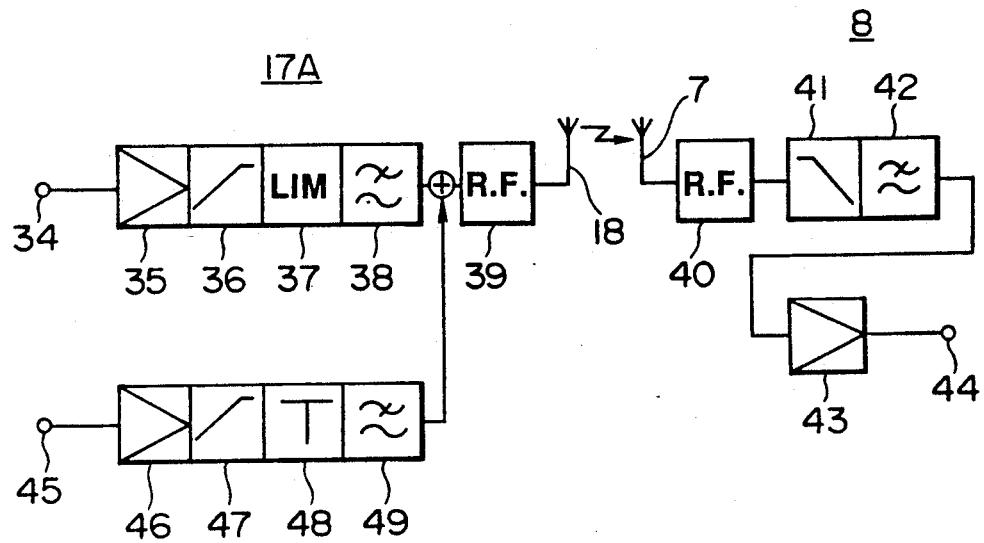
FIG. 5 is a schematic block diagram of a transmitter and receiver set included in the radio telephone system of FIG. 4.

Referring to FIGS. 4 and 5, there is shown one embodiment of a radio telephone system made in accordance with the invention. The structure shown in FIGS. 4 and 5 is generally the same as shown in FIGS. 1 and 2 except for the transmitter arrangement. Accordingly, components in FIGS. 4 and 5 which are like those in FIGS. 1 and 2 have been given like reference numerals and will not described further to avoid duplicity.

The transmitter 17A includes a radio frequency section 39 having a first input connected through a voice audio signal path to a voice audio input terminal 34 connected to the microphone 16. The radio frequency section 39 has a second input connected through a data signal path to a data input terminal 45 for connection to a facsimile system or the like. The voice audio signal path, which includes an amplifier 35, a pre-emphasis circuit 36, a limiter 37 and a splatter filter 38, is generally the same as shown in FIG. 2. The data signal path includes an amplifier 46, a pre-emphasis circuit 47, a level setting circuit 48 and a low pass filter 49. The amplifier 46 amplifies the data signal fed thereto from the terminal 45 at a predetermined amplification degree which may be the same as that of the amplifier 35. The amplified signal is then passed to the pre-emphasis circuit 47. The signal is then passed from the pre-emphasis circuit 47 to the level setting circuit 48 which attenuates the received signal level by a predetermined amount so that the radio frequency section 39 can modulate the carrier wave fed thereto from the frequency synthesizer 19 (FIG. 4) at a modulation degree smaller than that determined for voice audio signals. The attenuated signal is then passed to the low-pass filter 49 having a cutoff frequency of 3300 Hz. The low-pass filter 49 produces a modulation signal applied to the radio frequency section 39. The radio frequency section 39 uses the modulating signal to modulate the carrier wave fed thereto from the frequency synthesizer 19. The modulated carrier wave is transmitted through the transmit aerial 18 to the base unit 1. The transmitted signal is received through the receive aerial 7 by the receiver 8. The receiver 8, which includes a demodulator 40, a de-emphasis circuit 41, a low-pass filter 42, and an amplifier 43, is generally the same as shown in FIG. 2.

With this arrangement, the transmitter 17A has a first modulation characteristic when a voice audio signal is applied to the voice audio input terminal 34. The first modulation characteristic is determined by a first modulation frequency band width and a first modulation degree. The first modulation frequency band width is determined by the frequency band width of the modulating signal applied to the radio frequency section 39, and the first modulation degree is determined by the level of the modulating signal applied to the radio frequency section 39. The transmitter 17 has a second modulation characteristic when a data signal is applied to the data signal input terminal 45. The second modulation characteristic is determined by a second modulation frequency band width which is wider than the first modulation frequency band width and a second modulation degree which is smaller than the first modulation degree.

Figure 6:
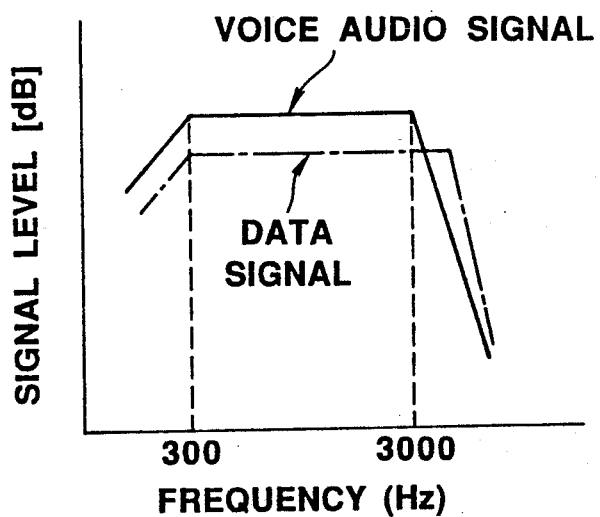
FIG. 6 is a graph of frequency versus level.

FIG. 6 shows the frequency characteristics of two signals appearing at the output terminal 44 of the receiver 8. The linear scale is along the vertical axis, and the log scale is along the horizontal axis. The solid curve relates to a voice audio signal. The one-dotted curve relates to a data signal. As can be seen from FIG. 6, the level of the data signal below a frequency of 300 Hz is determined by the cutoff frequency of the pre-emphasis circuit 47. The level of the data signal above a frequency of 3300 Hz is determined by the cutoff frequency of the low-pass filter 49. The data signal has a frequency band width wider than that of the voice audio signal. In addition, the data signal has a level lower than that of the voice audio signal. It is, therefore, apparent that the radio frequency section 39 modulates the carrier wave fed thereto from the synthesizer 19 at a modulation degree smaller for data signals than for voice audio signals. This is effective to improve the data communication quality without reducing the number of the available radio telephone channels. It is preferable to further improve the quality of the data communication between the base unit 1 and the radio telephone 2 by arranging the transmitter 5 of the base unit 1 as described in connection with the transmitter 17A of FIG. 5.

Figure 7:
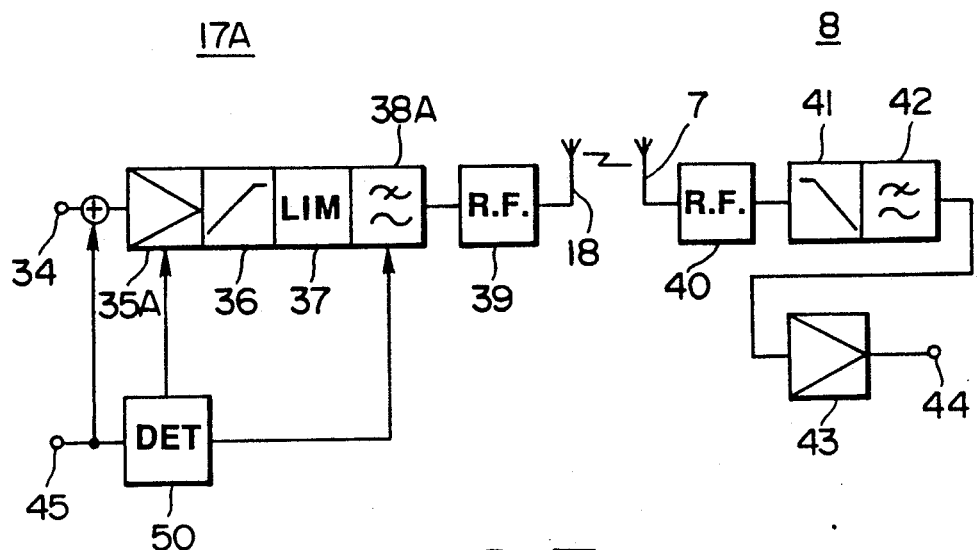
FIG. 7 is a schematic block diagram showing a modified form of the transmitter of FIG. 5.

Referring to FIG. 7, there is shown a modified form of the transmitter 17A where the radio frequency section 39 is connected through a single signal path to the voice audio input terminal 34 and to the data signal input terminal 45. The signal path includes an amplifier 35A having inputs from the input terminals 34 and 45. The amplifier 35A normally amplifies a received signal at a first amplification degree for voice audio signals. The amplifier 35A amplifies a received signal at a second, smaller amplification degree for data signals when a data signal appears at the data input terminal 45. The amplified signal is then passed to a splatter filter 38A through a pre-emphasis circuit 36 and a limiter 37. The pre-emphasis circuit 36 and the limiter 37 are generally the same as described in connection with FIG. 5. Normally, the splatter filter 38A has a first cutoff frequency (3000 Hz) for voice audio signals. The splatter filter 38A has a second, higher cutoff frequency (3300 Hz) when a data signal appears at the data signal input terminal 45. The data signal input terminal 45 is also connected to a signal detector 50. The signal detector 50 produces first and second detection signals respectively to the amplifier 35A and the splatter filter 38A when a data signal appears at the data signal input terminal 45. The first detection signal causes the amplifier 35A to select the second, smaller amplification degree, and the second detection signal causes the splatter filter 38A to select the second, higher cutoff frequency. The receiver 8, which includes a radio frequency section 40, a de-emphasis circuit 41, a low-pass filter 42 and an amplifier 43, is generally the same as described in connection with FIG. 5. This modification is effective to reduce the number of components required to form the transmitter 17A. It is noted, of course, that the transmitter 5 of the base unit may be arranged in the same manner as described in connection with the transmitter 17A of FIG. 7.

Figure 9:
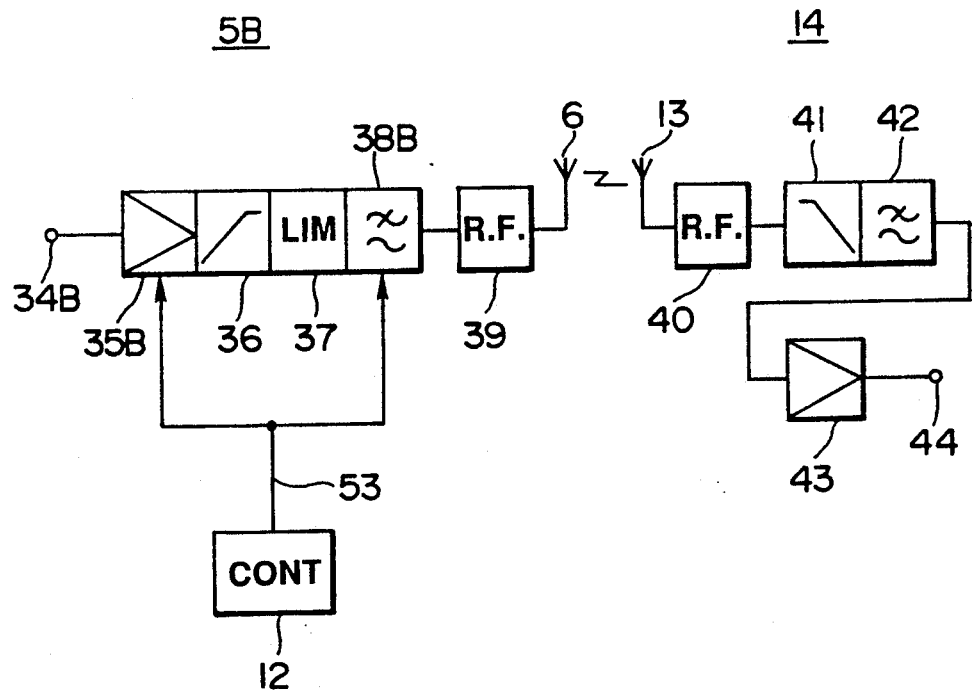
FIG. 9 is a schematic block diagram showing a transmitter and receiver set included in the radio telephone system of FIG. 8.
Figure 8:
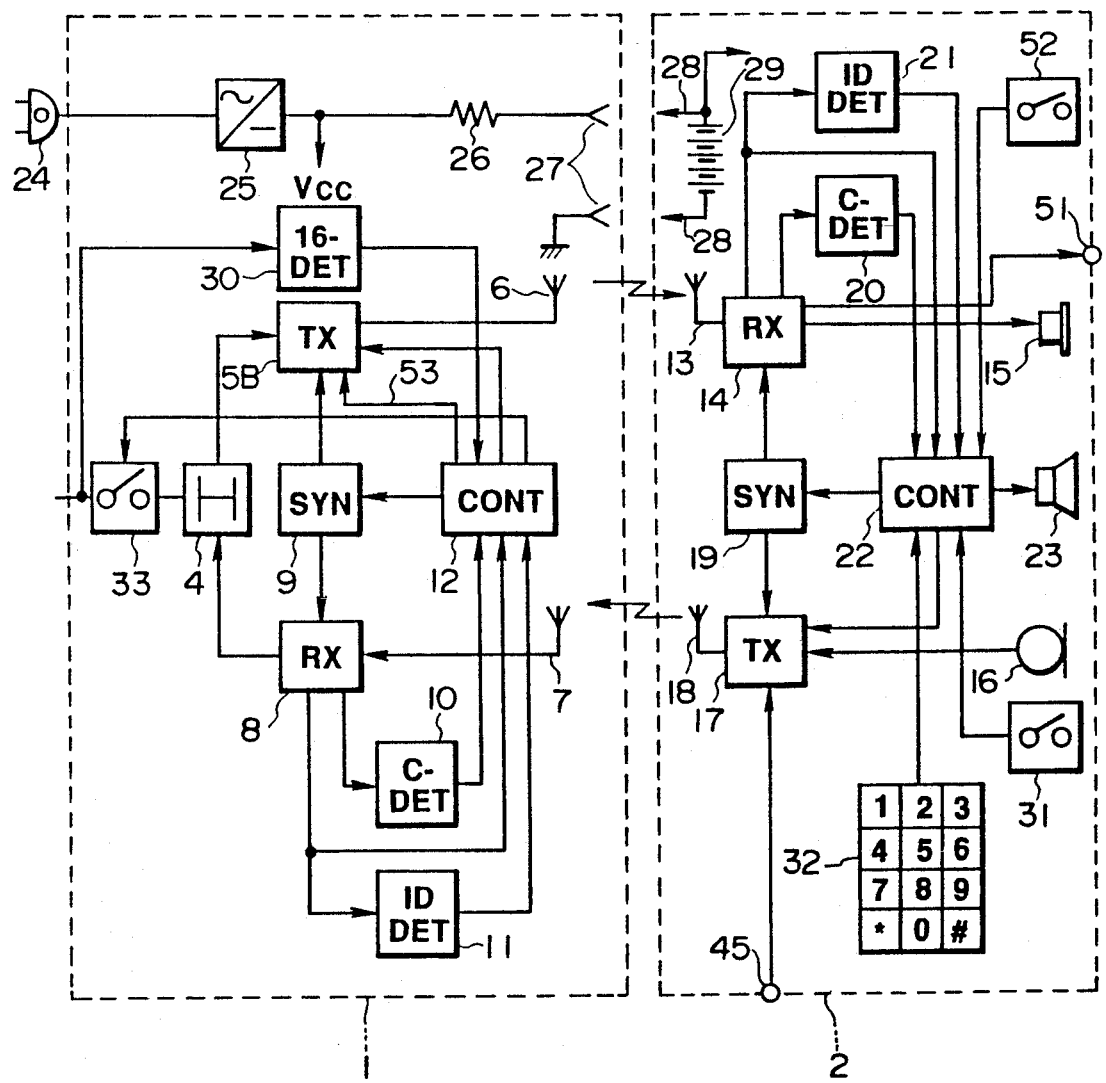
FIG. 8 is a schematic block diagram showing a second embodiment of the radio telephone system of the invention.

Referring to FIGS. 8 and 9, there is shown a second embodiment of the radio telephone system of the invention which is generally the same as the first embodiment of FIGS. 4 and 5 except for the transmitter arrangement. Components in FIGS. 8 and 9 which are like those in FIGS. 4 and 5 have been given like reference numerals and will not described further to avoid duplicity.

In this embodiment, the transmitter 5B includes a radio frequency section 39 having an input connected through a single signal path to an input terminal 34B connected to the hybrid circuit 4. The signal path includes an amplifier 35B having an input connected to the input terminal 34B. The amplifier 35B normally amplifies a received signal at a first amplification degree for voice audio signals. The amplifier 35B amplifies a received signal at a second, smaller amplification degree for data signals when it receives a logic "1" level signal. The amplified signal is then passed to a splatter filter 38B through a pre-emphasis circuit 36 and a limiter 37. The pre-emphasis circuit 36 and the limiter 37 are generally the same as described in connection with FIG. 5. Normally, the splatter filter 38B has a first cutoff frequency (3000 Hz) for voice audio signals. The splatter filter 38B has a second, higher cutoff frequency (3300 Hz) when it receives a logic "1" level signal. The control circuit 12 produces a control signal through a control signal line 53 to the amplifier 35B and also to the splatter filter 38B. The control signal has a logic "0" level when a voice audio signal is applied to the transmitter 5B and a logic "1" level when a data signal is applied to the transmitter 5B as described later. The receiver 14, which includes a radio frequency section 40, a de-emphasis circuit 41, a low-pass filter 42 and an amplifier 43, is generally the same as described in connection with the receiver 8 of FIG. 5 except that the output terminal 44 of the receiver 14 is connected to a data output terminal 51 as well as to the speaker 15. In FIG. 8, the numeral 52 designates a manual switch closed by the user when a data communication is required.

Figure 10:
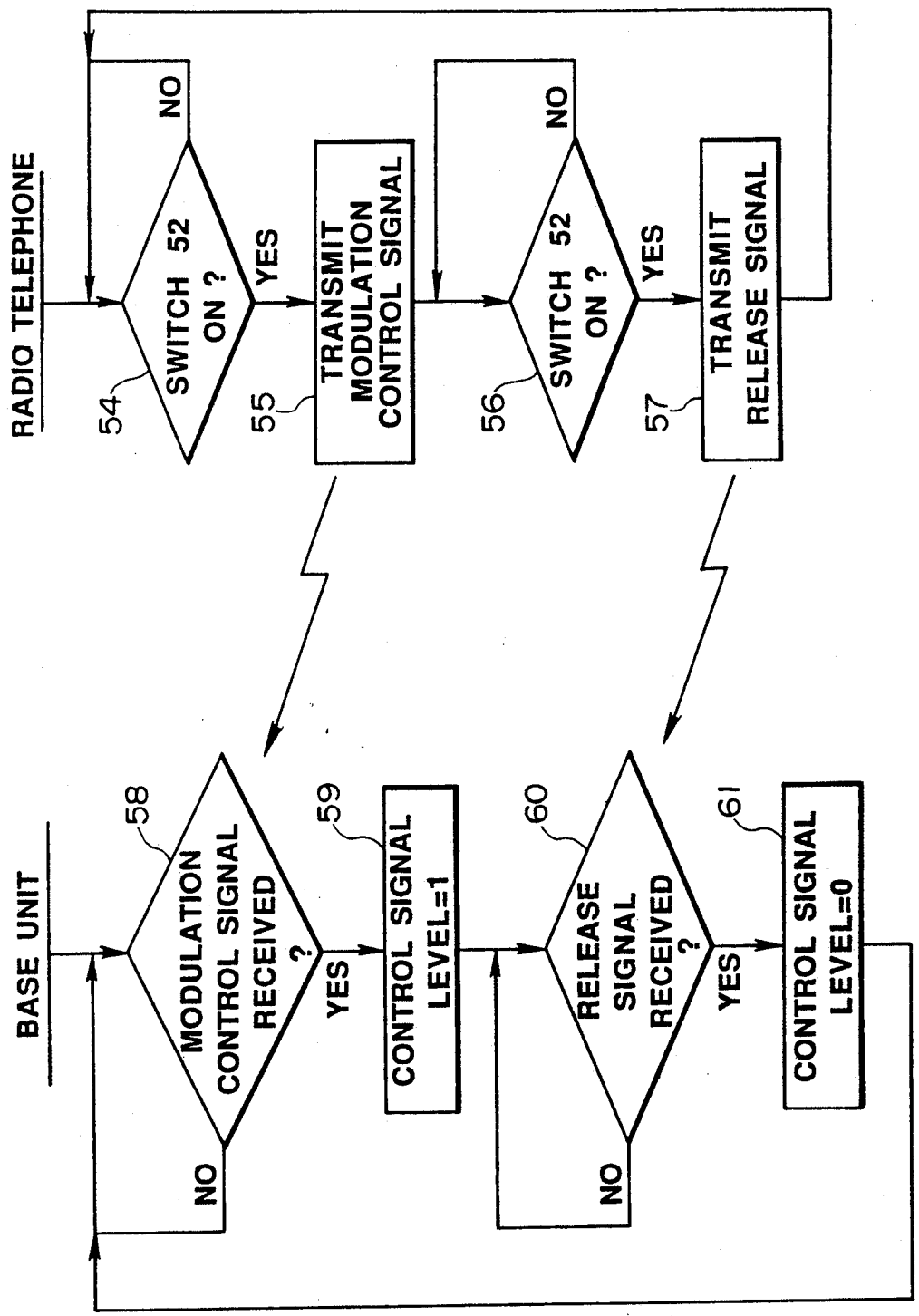
FIG. 10 is a flow diagram used in explaining the operation of the radio telephone system of FIG. 8.

The operation will be described with reference to the flow diagram of FIG. 10. The control circuit 22 awaits the receipt of a signal indicating the closure of the manual switch 52 (step 54). When the manual switch 52 is closed, the control circuit 22 produces a command causing the transmitter 17 to produce a modulation control signal (step 55). This modulation control signal is transmitted through the transmit aerial 18 to the base unit 1.

The control circuit 12 awaits the receipt of a modulation control signal produced when the manual switch 52 is closed (step 58). When the modulation control signal is received through the receive aerial 7, the control circuit 12 changes the control signal fed on the control signal line 53 from the logic "0" level to a logic "1" level (step 59). The amplifier 35B responds to the logic "1" level control signal by selecting the second, smaller amplification degree, and the splatter filter 38B responds to the logic "1" level control signal by selecting the second, higher cutoff frequency. When a data signal is inputted through the telephone network 3 to the base unit 1 under this condition, it is converted into a modulating signal having a level lower than that determined for voice audio signals and a frequency band width wider on its high frequency side than that determined for voice audio signals. The modulating signal is then passed to the radio frequency section 39 where it is used to modulate the carrier wave fed from the frequency synthesizer 9. The modulated carrier wave is transmitted through the transmit aerial 6 to the radio telephone 2.

The control circuit 22 awaits the receipt of a signal indicating the manual switch 52 opening (step 56). When the user opens the manual switch 52 after the data communication is terminated, the control circuit 22 produces a command causing the transmitter 17 to produce a release signal (step 57). The release signal is transmitted through the transmit aerial 18 to the base unit 1.

The control circuit 12 awaits the receipt of a release signal (step 60). When the release signal is received by the receive aerial 7, the control circuit 12 changes the control signal on the signal line 53 to a logic "0" level (step 61) so as to return the transmitter 5B into the initial condition where the amplifier 35B selects the first amplification degree and the splatter filter 38B selects the first cutoff frequency. The transmitter 5B remains in a condition suitable for data communication as long as the manual switch 52 is closed.

Figure 11:
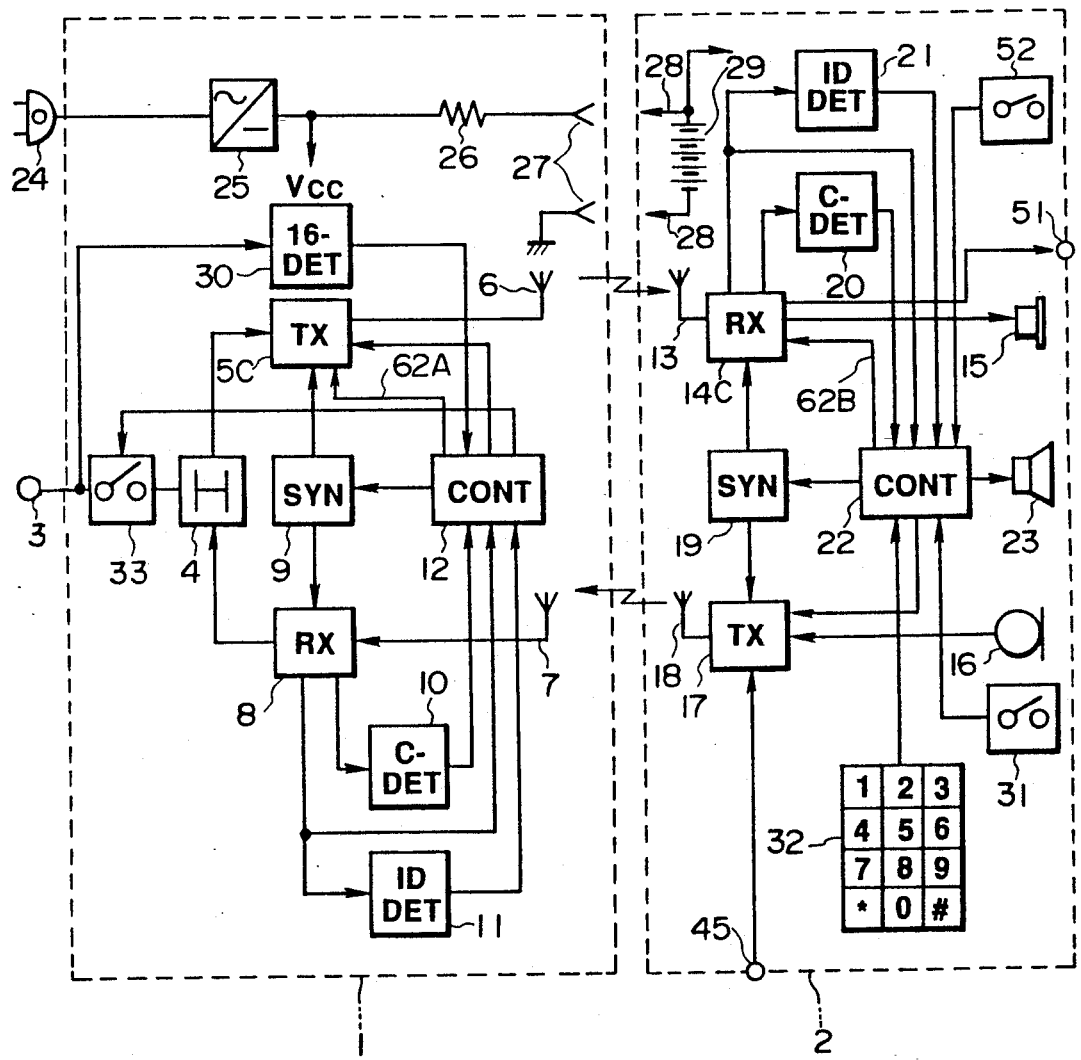
FIG. 11 is a schematic block diagram showing a modified form of the radio telephone system of FIG. 8.
Figure 12:
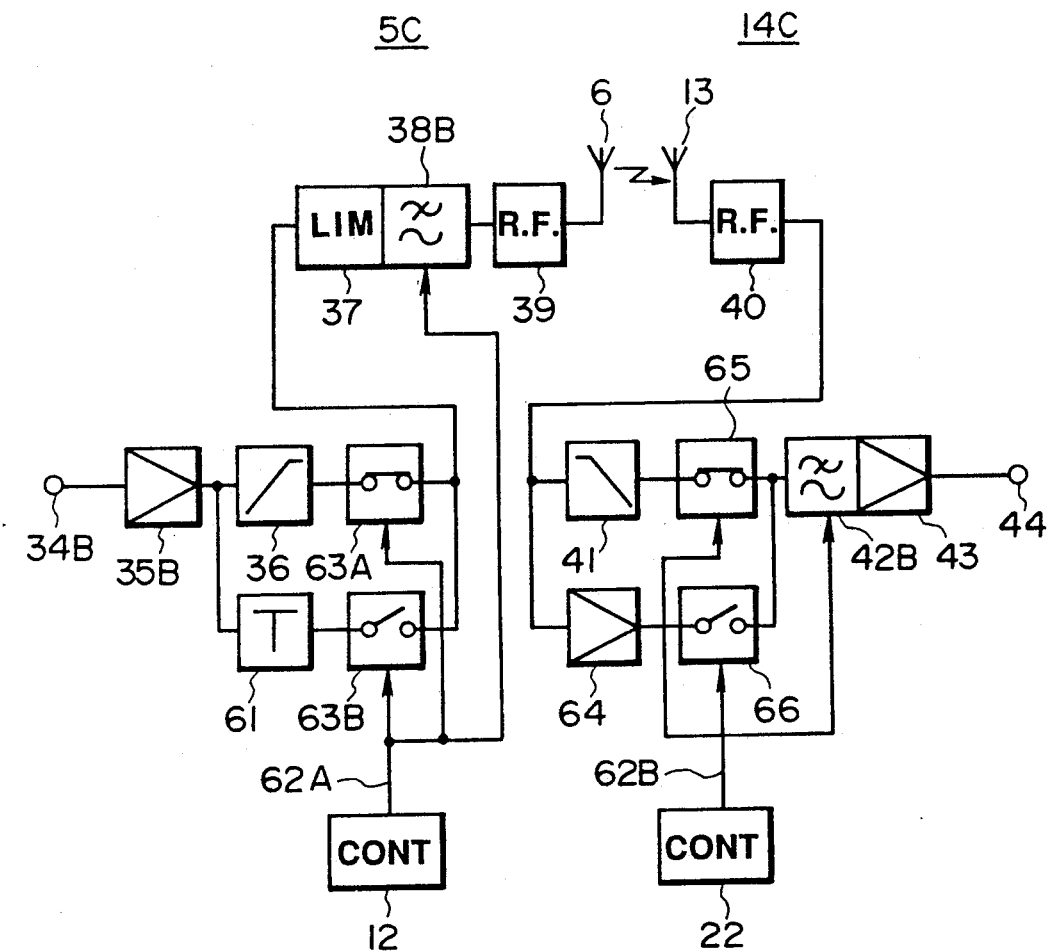
FIG. 12 is a schematic block diagram showing a transmitter and receiver set included in the radio telephone system of FIG. 11.

Referring to FIGS. 11 and 12, there is shown a modified form of the radio telephone system of the second embodiment of FIGS. 8 and 9. In this modification, the transmitter 5C includes a modulator 39 having an input connected through a signal path to an input terminal 34B connected to the hybrid circuit 4. The signal path includes an amplifier 35B having an input coupled to the input terminal 34B for amplifying a signal fed thereto from the hybrid circuit 4 at a predetermined amplification degree. The amplified signal is divided along two paths, the first path leading to a pre-emphasis circuit 36 having a predetermined cutoff frequency (300 Hz) and hence through a normally closed switch 63A to a limiter 37. The second path leads to a level setting circuit 61 and hence through a normally open switch 63B to the limiter 37. The level setting circuit 61 sets the level of the signal passing through the second path at a value smaller than that of the signal passing through the first path. The limiter 37 prevents the amplitude of the received signal from exceeding a certain value. The output of the limiter 37 is coupled to a splatter filter 38B which normally has a first cutoff frequency (3000 Hz). The splatter filter 38B has a second, higher cutoff frequency (3300 Hz) on command from the control circuit 12.

The control circuit 12 produces a control signal through a control signal line 62A to the transmitter 5C. The control signal is applied to the normally closed switch 63A, the normally open switch 63B and the splatter filter 38B. Normally, the control signal has a logic "0" level indicative of the fact that no modulation control signal is received. When a modulation control signal is received from the radio telephone 2, the modulation control signal indicating the closure of the manual switch 52, the control signal changes to a logic "1" level, causing the switch 63A to open so as to disable the first path, the switch 63B to close so as to enable the second path, and the splatter filter 38B to select the second, higher cutoff frequency. As a result, the modulation signal applied to the radio telephone 39 has a smaller level and a wider frequency band width for data signals than for voice audio signals. Consequently, the radio telephone 39 modulates the carrier wave fed thereto from the frequency synthesizer 9 at a smaller modulation degree for data signals than for voice audio signals. The modulated signal is transmitted through the transmit aerial 6 to the radio telephone 2.

The receiver 14C includes a radio frequency section 40 which is associated with the frequency synthesizer 19 to demodulate the received signal. The demodulated signal is divided along two paths, the first path leading to a de-emphasis circuit 41 and hence through a normally closed switch 65 to a splatter filter 42B. The second path leads to an amplifier 64 and hence through a normally open switch 66 to the splatter filter 42B. Normally, the splatter filter 42B has a first cutoff frequency (3000 Hz). The splatter filter 42B has a second, higher cutoff frequency (3300 Hz) on command from the control circuit 22. The output of the splatter filter 42B is coupled through an amplifier 43 to the output terminal 44 of the receiver 14C.

The control circuit 22 produces a control signal through a control signal line 62B to the receiver 14C. The control signal is applied to the normally closed switch 65, the normally open switch 66 and the splatter filter 42B. Normally, the control signal has a logic "0" level indicative of the fact that the manual switch 52 is open. When the user closes the manual switch 52, the control signal changes to a logic "1" level, causing the switch 65 to open so as to disable the first path, the switch 66 to close so as to enable the second path, and the splatter filter 42B to select the second, higher cutoff frequency. It is, therefore, possible to improve the quality of the data communication also on the side of the radio telephone 2.

Figure 13:
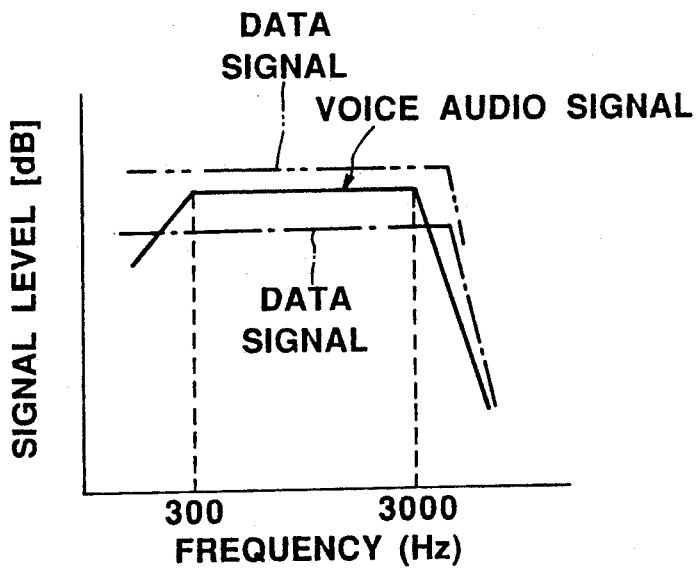
FIG. 13 is a graph of frequency versus level.

FIG. 13 shows the frequency characteristics of the signals obtained at the output terminals 44 of the receiver 14C. The linear scale is along the vertical axis, and the log scale is along the horizontal axis. The solid curve relates to a voice audio signal, the one-dotted curve relates to a data signal obtained with the cordless telephone system of FIGS. 8 and 9, and the two-dotted curve relates to a data signal obtained with the cordless telephone system of FIGS. 11 and 12. As can be seen from FIG. 13, the received signal level is greater with the cordless telephone system of FIGS. 11 and 12 than with the cordless telephone system of FIGS. 8 and 9.

It is to be understood, of course, that the transmitter 17 and the receiver 8 may be modified in a similar manner to improve the quality of the data communication from the radio telephone 2 to the base unit 1.

Generally, the S/N ratio is smaller for data signal communication than for voice audio signal communication. For this reason, it is preferable to permit data communication only when the detected intensity of the electric field of the received signal is sufficient to provide an S/N ratio suitable for data signal.

What is claimed is:
1. A radio telephone system, comprising:
a base unit connected to a wire telephone network;
a radio telephone for communication with the base unit through a radio link;
first modulation characteristic establishing means for establishing a first modulation characteristic for a first signal transmitted through the radio link;
second modulation characteristic establishing means for establishing a second modulation characteristic for a second signal transmitted through the radio link; and
modulation means for selecting one of the first and the second modulation characteristic establishing means depending on whether a signal to be transmitted between the base unit and the radio telephone through the radio link is the first signal or the second signal, and for controlling a modulation characteristic for the signal to be transmitted through the radio link by one of the modulation characteristics established by the selected one of the modulation characteristic establishing means,
wherein the first modulation characteristic establishing means includes a first amplifier for amplifying the voice audio signal, a first pre-emphasis circuit receiving an output from the first amplifier, a limiter receiving an output from the first pre-emphasis circuit and a first filter receiving an output from the limiter, and wherein the second modulation characteristic establishing means includes a second amplifier for amplifying the data signal, a second pre-emphasis circuit receiving an output from the second amplifier, a level setting circuit receiving an output from the second pre-emphasis circuit and a second filter receiving an output from the level setting circuit.

2. A radio telephone system, comprising:
a base unit connected to a wire telephone network;
a radio telephone for communication with the base unit through a radio link by a radio circuit;
signal detecting means for detecting whether a signal which is to be transmitted through the radio link is a voice audio signal or a data signal;
modulation characteristic selecting means for selecting one of two predetermined modulation characteristics for the signal to be transmitted through the radio link in accordance with the detection made by the signal detecting means,
wherein the modulation characteristic selecting means includes:
an amplifier for amplifying a voice-audio signal or data signal at an amplification degree changed in response to the detection signal fed thereto from the signal detecting means;
a pre-emphasis circuit receiving an output from the amplifier;
a limiter receiving an output from the pre-emphasis circuit;
a filter receiving an output from the limiter, the filter having a frequency characteristic changed in response to the detection signal fed thereto from the signal detecting means; and
a radio frequency section receiving an output from the filter, for controlling a modulation characteristic for the signal to be transmitted through the radio link in accordance with the output from the filter.

3. A radio telephone system, comprising:
a base unit connected to a wire telephone network;
a radio telephone for communication with the base unit through a radio link;
first modulation characteristic establishing means for establishing a first modulation characteristic for a first signal transmitted through the radio link;
second modulation characteristic establishing means for establishing a second modulation characteristic for a second signal transmitted through the radio link; and
modulation means for selecting one of the first and the second modulation characteristic establishing means depending on whether a signal to be transmitted between the base unit and the radio telephone through the radio link is the first signal or the second signal, and for controlling a modulation characteristic for the signal to be transmitted through the radio link by one of the modulation characteristics established by the selected one of the modulation characteristic establishing means,
wherein the first modulation characteristic establishing means includes first means for establishing a modulation frequency characteristics for the first signal transmitted through the radio link, and second means for establishing a modulation degree for the first signal transmitted through the radio link, and wherein the second modulation characteristic establishing means includes third means for establishing a modulation frequency characteristic for the second signal transmitted through the radio link, and fourth means for establishing a modulation degree for the second signal transmitted through the radio link.

4. The radio telephone system as claimed in claim 3, wherein the first signal is a voice audio signal and the second signal is a data signal.

5. The radio telephone system as claimed in claim 3, wherein the first, second, third and fourth means are provided in one of the base unit and the radio telephone.

6. The radio telephone system as claimed in claim 3, wherein the first, second, third and fourth means are provided in both of the base unit and the radio telephone.

7. A radio telephone system, comprising:
a base unit connected to a wire telephone network;
a radio telephone for communication with the base unit through a radio link by a radio circuit;
signal detecting means for detecting whether a signal which is to be transmitted through the radio link is a voice audio signal or a data signal;
modulation characteristic selecting means for selecting one of two predetermined modulation characteristics for the signal to be transmitted through the radio link in accordance with the detection made by the signal detecting means,
wherein the modulation characteristic selecting means selects one of two predetermined modulation frequency characteristics and one of two modulation degrees.

8. The radio telephone system as claimed in claim 7, wherein the radio telephone includes means for inputting a data signal, and the signal detecting means detects that the data signal is to be transmitted through the radio link when a data signal source is connected to the data signal inputting means.

9. The radio telephone system as claimed in claim 8, wherein the modulation characteristic switching means is provided in the radio telephone.

10. A radio telephone system, comprising:
a base unit connected to a wire telephone network;
a radio telephone for communication with the base unit through a radio link;
signal selecting means for selecting whether a signal which is to be transmitted through the radio link is a voice audio signal or a data signal;
modulation characteristic selecting means for selecting one of two predetermined modulation characteristics for the signal to be transmitted through the radio link in accordance with the selection made by the signal selecting means,
wherein the modulation characteristic selecting means selects one of two predetermined modulation characteristics comprising different modulation frequency characteristics and modulation degree.

11. The radio telephone system as claimed in claim 10, wherein the modulation characteristic selecting means includes:
an amplifier for amplifying a voice-audio or data signal at an amplification degree changed in accordance with the selection made by the signal selecting means;
a pre-emphasis circuit receiving an output from the amplifier;

a limiter receiving an output from the pre-emphasis circuit;

a filter receiving an output from the limiter, the filter having a frequency characteristic which is changed in accordance with the selection made by the signal selecting means; and a radio frequency section receiving an output from the filter, for controlling a modulation characteristic for the signal to be transmitted through the radio link in accordance with the output from the filter.

12. The radio telephone system as claimed in claim 10, wherein the signal selecting means comprises a manual switch provided in the radio telephone.

13. The radio telephone system as claimed in claim 12, wherein the modulation characteristic selecting means is provided in the base unit, the modulation characteristic selecting means selecting the modulation characteristic in response to a modulation control signal transmitted through the radio link from the radio telephone to the base unit when the manual switch is operated.

* * * * *